United States Patent [19]
Givens

[11] 3,800,150
[45] Mar. 26, 1974

[54] METHOD AND APPARATUS FOR RADIOACTIVE WELL LOGGING EMPLOYING PARTIALLY OVERLAPPING TIME WINDOWS FOR DETECTION OF RADIATION

[75] Inventor: Wyatt W. Givens, Dallas, Tex.

[73] Assignee: Mobil Oil Corporation, New York, N.Y.

[22] Filed: May 9, 1972

[21] Appl. No.: 251,629

[52] U.S. Cl................ 250/262, 250/269, 250/270, 250/499
[51] Int. Cl............................................... G01v 5/00
[58] Field of Search........ 250/83.3 R, 83.1, 83.6 W, 250/262, 269, 270, 499

[56] References Cited
UNITED STATES PATENTS 2,991,364  7/1961  Goodman.................. 250/83.6 W X
3,487,211  12/1969  Youmans....................... 250/83.3 R

OTHER PUBLICATIONS

The Thermal Neutron Decay Time Log by Wahl et al., 1968, pages 1 and 8.

Primary Examiner—Archie R. Borchelt
Attorney, Agent, or Firm—A. L. Gaboriault; William D. Jackson

[57] ABSTRACT

Methods and apparatus for radioactive well logging in which the formation is irradiated with bursts of primary radiation and the resulting secondary radiation is measured by employing partially overlapping detection windows. The invention may be employed in thermal neutron decay logging with the measurements obtained during the partially overlapping time windows employed to derive a decay parameter of the thermal neutron population developed in a formation as a result of bursts of fast neutrons. In addition radiation attendant to the thermal neutron population may be detected over a third time interval and employed to derive a background correction factor, and also to provide an indication of the porosity of the formation.

18 Claims, 4 Drawing Figures

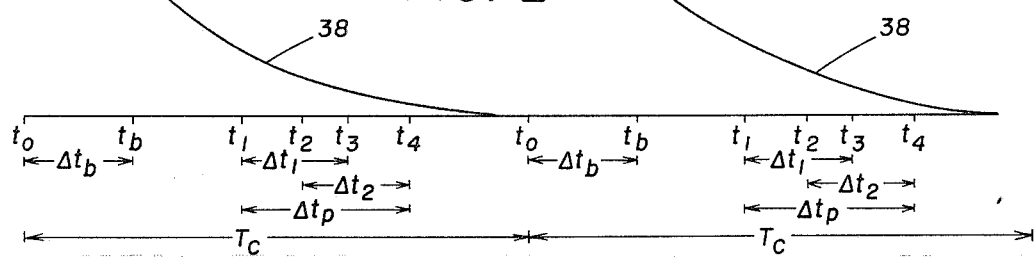
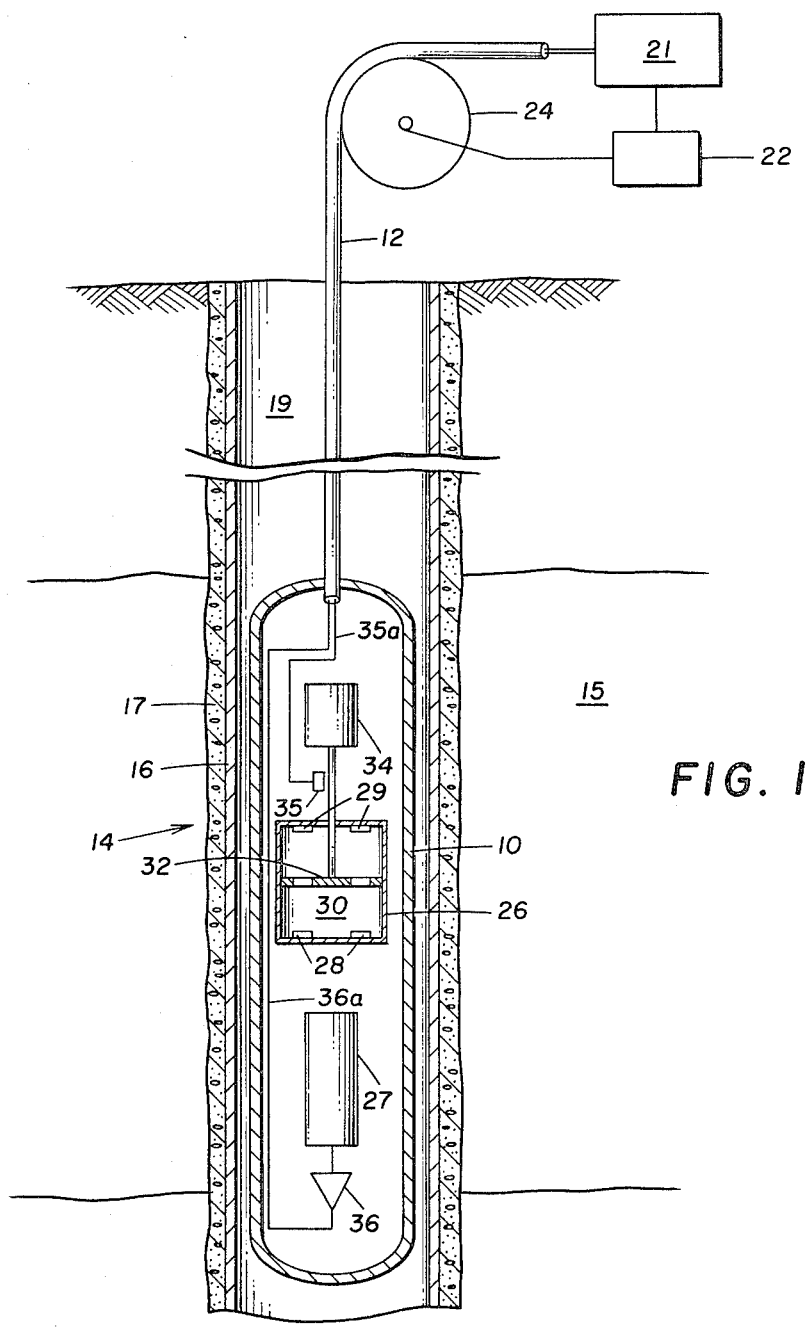

METHOD AND APPARATUS FOR RADIOACTIVE WELL LOGGING EMPLOYING PARTIALLY OVERLAPPING TIME WINDOWS FOR DETECTION OF RADIATION

BACKGROUND OF THE INVENTION

This invention relates to radioactive well logging and more particularly to well logging processes and systems for irradiating subterranean formations under investigation with a primary radiation burst and characterizing the formation on the basis of the decay of the resulting secondary radiation.

In the petroleum industry, various pulsed radiation logging techniques are employed in order to characterize subterranean formations with regard to their mineral content or to provide for stratigraphic correlation of such formations. In these techniques, a formation under investigation is irradiated with a burst of primary radiation and the resulting secondary radiation is measured during two or more sequential time intervals in order to determine decay characteristics such as mean or half lives or various nuclear cross sections.

Exemplary of such techniques are the "pulsed neutron logging" procedures. In these procedures the formations under investigation are irradiated with repetitive bursts of fast neutrons, normally neutrons exhibiting an energy greater than 1 mev. When the fast neutrons enter the formation, they are moderated, or slowed down, by nuclei within the formation to form lower energy neutron populations. The fast neutrons are moderated to lower energy levels by the nuclear collision processes of elastic and inelastic scattering. In elastic scattering the neutron loses a portion of its energy in a collision that is perfectly elastic, i.e., the energy lost by the neutron is acquired by the nucleus with which it collides. In inelastic scattering only some of the energy lost by the neutron is acquired by the collision nucleus, with the remaining energy loss generally taking the form of a gamma ray emitted from the collision nucleus.

In the course of moderation, the neutrons reach the epithermal range and thence are further moderated until they reach the thermal neutron range. Thermal neutrons are neutrons which are in thermal equilibrium with their environment; at 20° C. a kinetic energy of about 0.025 ev. Epithermal neutrons are those neutrons which exhibit energies within the range from immediately above the thermal neutron level to about 100 ev.

The populations of neutrons at the various energy levels decay with time following primary irradiation and thus offer means of characterizing the formation. For example, in the case of elastic scattering, which predominates below energies of about 1 mev, the number of collisions required for a neutron to moderate from one energy level to a second lower energy level varies more or less directly with the atomic weight of the nuclei available for collision. In subterranean formations, hydrogen nuclei present in hydrogenous materials such as oil, water, and gas tend to predominate in the slowing down process. Thus, the rate of decay of the epithermal neutron population gives a qualitative indication of the amount of hydrogenous material present which in turn may be indicative of the porosity of the formation.

Once a neutron reaches the thermal energy level, it diffuses through the formation until it is captured by a nucleus. This capture is attended by the emission of one or more gamma rays. The propensity for a nucleus to capture a thermal neutron is indicated by its microscopic capture cross section. This parameter remains the same regardless of the chemical composition in which the nucleus exists. Thus, the macroscopic capture cross section of a formation is determined by the microscopic cross section of its constituent elements and the number of nuclei per unit volume of each constituent present. Of the various elements typically encountered in subterranean formations, chlorine exhibits a relatively high capture cross section and thus its presence in a formation will be attended by a relatively high macroscopic capture cross section. Accordingly, the macroscopic capture cross section of a formation, which is inversely proportional to the mean life of thermal neutrons in the formation, may be measured in order to characterize a formation with regard to its chlorine content.

In view of the foregoing, it will be recognized that various advantages may derive from the measurement of secondary radiation such as neutrons of various energy levels or gamma rays resulting from inelastic scattering or thermal neutron capture. For example, U. S. Pat. No. 3,379,884 to Youmans discloses a well logging process in which a formation under investigation is irradiated with a burst of fast neutrons and the decay of the resulting thermal neutron population measured by detecting thermal neutrons, or gamma rays associated with thermal neutron capture, during a plurality of time intervals subsequent to the neutron burst. In this process, the ratio of the count rates determined in two detection intervals is recorded with depth to give an indication of the decay of the thermal neutron population. In U.S. Pat. No. 3,413,473 to Mills there is disclosed a somewhat more sophisticated method in which a decay parameter of a thermal neutron population is determined quantitatively. In Mills, thermal neutron counts are determined during two spaced time intervals following fast neutron irradiation. The logarithm of the ratio of the measurements for the two time intervals, or the difference of the logarithms of these measurements, is then obtained in order to arrive at a quantitative determination of a decay parameter.

U.S. Pat. No. 3,487,211 to Youmans discloses pulsed neutron logging techniques which involve the detection of thermal neutrons, epithermal neutrons, and fast neutrons. The fast neutron detection in Youmans is employed to monitor the output of the fast neutron source. The epithermal neutron detection is employed to obtain an indication of the decay of the epithermal neutron count in order to arrive at an indication of porosity. Epithermal neutron detection may be accomplished over successive time intervals or over two overlapping time intervals one of which completely encompasses the other. For a further disclosure of pulsed neutron logging techniques, reference may be made to U.S. Pat. No. 3,379,882 to Youmans which discloses the detection of thermal neutrons, epithermal neutrons, fast neutrons, and gamma rays associated with capture and with inelastic scattering.

SUMMARY OF THE INVENTION

In accordance with the present invention, there are provided new and improved well logging processes and systems wherein the detection of secondary radiation is accomplished during a plurality of partially overlapping time intervals. The system comprises a well logging tool having a primary pulsed radiation source and a detection unit which detects secondary radiation and produces output signals in response thereto. First and second measuring channels are provided which produce count rate functions in response to signals received from the detection unit. Signals from the detection unit are applied to the measuring channels through gates primary to each channel. The gates are operated by control means which are synchronized with the source and function to actuate the gates respectively during repetitive first time intervals and repetitive second time intervals which partially overlap the first time intervals.

In a preferred embodiment of the invention, a formation under investigation is irradiated with a burst of fast neutrons. These fast neutrons are moderated within the formation by the scattering processes to form a population of lower energy neutrons. Radiation attendant to this lower energy neutron population is selectively detected during each of first and second time intervals which occur subsequent to the initiation of the fast neutron burst. The second time interval begins during the first time interval and terminates subsequent thereto whereby the second time interval partially overlaps the first.

In a further aspect of the invention, radiation attendant to the lower energy neutron population also is detected during a third time interval. A background correction factor is derived from the measurement obtained during this latter interval and applied to the measurements obtained during the first and second time intervals in order to provide a background correction in these measurements. In addition, a function representative of the radiation measurement obtained during the third time interval is correlated with depth in order to provide an indication of the porosity of the formation.

BRIEF DESCRIPTION OF THE DRAWINGS

FIG. 1 is an illustration, partly in section, showing a logging system embodying the present invention.

FIG. 2 is an illustration of thermal neutron decay curves and various time intervals involved in the invention.

DESCRIPTION OF SPECIFIC EMBODIMENTS

Figure 3:
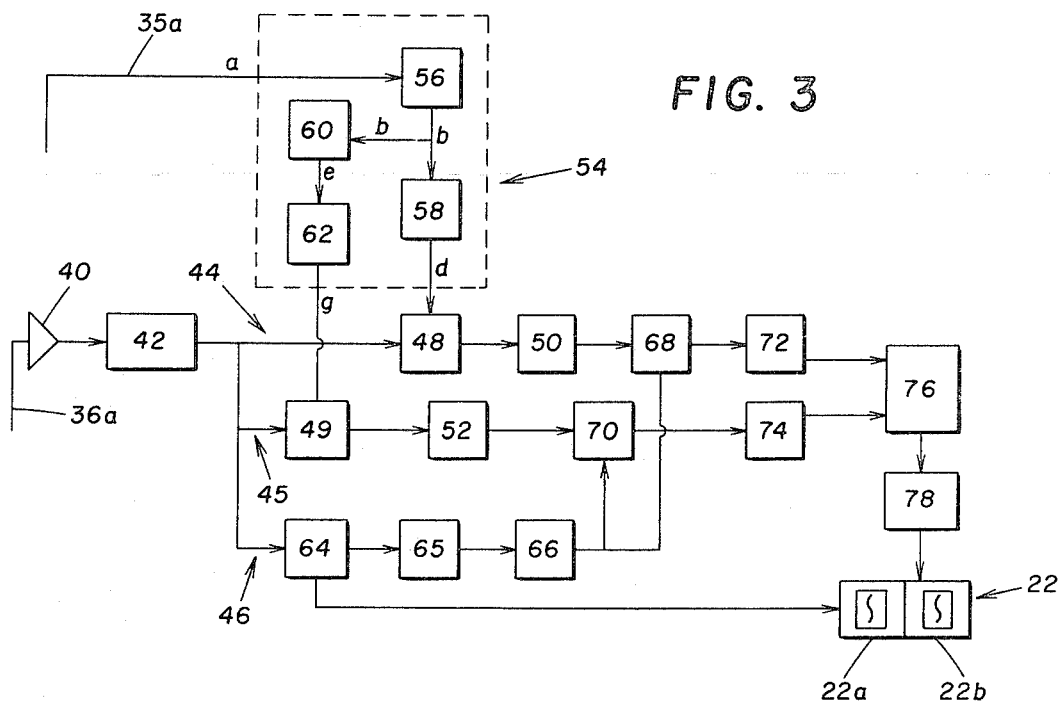
FIG. 3 is a block schematic of uphole circuitry which may be employed in the system of FIG. 1.

Secondary radiation induced in a subterranean formation as a result of a primary radiation burst decreases in time in accordance with the following well known relationship:

$$N_2 = N_1 e^{-\lambda t} \quad (1)$$

wherein:

$N_1$ is the number of radiation events present at a first time $t_1$, $N_2$ is the number of radiation events present at a second later time $t_2$, $e$ is the Napierian base 2.7183, $t$ is the time interval between $t_1$ and $t_2$, and $\lambda$ is a decay constant.

Equation (1) is a generalized relationship which describes the decay of induced radiation such as may result from the activation of radioelements by the primary radiation burst or from the primary burst itself as in the case of moderation of primary fast neutrons. From this relationship, it can be seen that the decay constant $\mu$ may be determined by measuring the value of N at two known times subsequent to primary irradiation.

In accordance with the present invention there is provided a new and improved technique for determining a decay constant, or a derivative factor thereof, by selectively measuring the radiation events under investigation during two time intervals which partially overlap one another. By this technique, for any given gross measurement period, each selective measurement interval, or "time window," may be wider than would otherwise be possible. Thus the measurements made during the partially overlapping time windows are statistically more accurate than would be the case with measurements made during sequential, mutually exclusive windows covering the same gross measurement period.

Turning now to FIG. 1, there is illustrated a pulsed neutron well logging system embodying the present invention. It will be assumed for the purposes of the present discussion that the logging system as shown in FIG. 1 is of the type employed to determine a thermal neutron decay parameter dependent upon the macroscopic capture cross section of the formation under investigation. However, as will be described in greater detail hereinafter, it is to be recognized that the invention may also be employed in other logging techniques which involve determination of a decay parameter of induced secondary radiation.

More particularly, and as illustrated in FIG. 1, there is shown a logging tool 10 which is suspended from a cable 12 within a well 14 traversing a formation of interest illustrated by reference character 15. The well normally will be lined by casing 16 and cement 17 and filled with a fluid such as drilling mud, oil, or water, indicated by reference character 19. Signals from the logging tool are transmitted uphole via conductors in cable 12 to an analyzing and control circuit 21 at the surface. Circuit 21 operates on the downhole measurements as explained in greater detail hereinafter and applies an output function to a recorder 22. As the tool is moved through the well a depth indicating means such as a measuring sheave 24 produces a depth signal which is applied to recorder 22, thus correlating the downhole measurements with the depths at which they are taken.

The logging tool 10 comprises a primary radiation source 26 for irradiating the formation under investigation with repetitive bursts of fast neutrons and a detector 27 for detecting secondary radiation resulting from the primary radiation bursts. In the embodiment shown in FIG. 1, the source is illustrated as a mechanically pulsed source comprising targets 28 which emit fast neutrons in response to irradiation with alpha particles from alpha emitters 29. The alpha emitters and targets are mounted within a chamber 30 which preferably is filled with a gas such as helium which is readily penetrated by alpha particles. Suitable target and emitter materials are beryllium and polonium, respectively.

The targets are periodically exposed to alpha particles from emitters 29 during spaced time intervals to produce bursts of fast neutrons. Such periodic exposure may be accomplished by means of an apertured shutter 32 which is interposed between the alpha emitters and targets and keyed to the drive shaft of a motor 34. Alternatively, such periodic exposure may be accomplished by moving the target and the emitter components relative to one another, for example, by supporting the emitters or targets on a rotor which is keyed to the motor shaft. Source 26 is also provided with a sync pulse generator 35 such as a magnetic pickup device which generates a sync pulse for each burst of fast neutrons. For a further description of mechanically pulsed neutron sources suitable for use in the present invention, reference is made to U.S. Pat. No. 3,389,257 to Caldwell et al.

The radiation detector 27 may comprise a thermal neutron detector or it may take the form of a gamma ray detector which is responsive to gamma rays associated with thermal neutron capture. The detection of such gamma rays, like the detection of thermal neutrons directly, will enable the determination of the desired thermal neutron decay parameters since the statistical probability of thermal neutron capture at any given time is directly proportional to the density of the thermal neutron population at that time.

A suitable radiation detector for use in the present invention may take the form of a helium-3 proportional counter of the type described in U.S. Pat. No. 3,102,198 to Bonner. Detectors of this type are responsive primarily to thermal neutrons and become essentially nonresponsive to neutrons of progressively higher energy levels. For example, a typical helium-3 counter, e.g., 1 inch in diameter with a helium-3 pressure of 10 atmospheres, may exhibit an efficiency in the detection of thermal neutrons of 99.8 percent. However, for 100 ev epithermal neutrons the detection efficiency declines to 9.8 percent and for 10 kev neutrons, it declines to only 1 percent. One or more of such helium-3 counters may be employed. For example, a logging tool may carry a plurality of such detectors connected in parallel with one another, but in series with the measurement circuitry as disclosed in the aforementioned patent to Caldwell et al. When employed in this manner, it will be understood that the several detectors function as a single detection unit. The output from detector 27 is amplified in the logging tool by an amplifier 36 and transmitted to the surface via a conductor 36a. The output from sync generator 35 is likewise transmitted to the surface on a conductor 35a.

In employing the logging system of FIG. 1, the source 26 is operated at the desired rate. For example, a suitable rate of operation may be on the order of 400 to 600 fast neutron bursts per second. The detection unit 27 is operated in conjunction with suitable gating circuitry to selectively detect the secondary radiation subsequent to each primary neutron burst during at least two time intervals which partially overlap one another. The gating circuitry may be employed to render downhole radiation detectors operative or responsive to the secondary radiation only during the desired measuring intervals or the downhole detector or detectors may be continuously responsive to secondary radiation and the gating circuitry employed to gate the detector output to separate measuring channels during the selected time intervals. The latter mode of operation is preferred since it enables the same downhole detection equipment to be used for both detection intervals, thus reducing instrumentation errors and allowing measurements for both time intervals to be made at a common location relative to the source 26.

In FIG. 2 there is shown a diagram illustrating thermal neutron decay curves during two successive cycles of operation together with the partially overlapping time intervals during which secondary radiation measurements are taken. In FIG. 2 thermal neutron intensity is plotted in ordinate against time on the abscissa. For each cycle of operation, the fast neutron bursts start at time $t_0$ and terminate at time $t_b$. The duration $\Delta t_b$ of the fast neutron burst may vary from a few microseconds up to several hundreds of microseconds. For mechanically pulsed sources such as described above, $\Delta t_b$ typically may be within the range of 300 to 600 microseconds. The resulting thermal neutron population is indicated by the thermal neutron decay curves 38, the period of thermal neutron population buildup during the primary fast neutron bursts not being shown.

Subsequent to a fast neutron burst and after a further time delay, a first measurement interval is started at time $t_1$. This measurement interval continues until time $t_3$ to provide a time window $\Delta t_1$. Subsequent to $t_1$ but prior to $t_3$ a second measurement interval is started at time $t_2$ and continues through a duration $\Delta t_2$ until it terminates at $t_4$. The overall gross measurement period between $t_1$ and $t_4$ is indicated in FIG. 2 by $\Delta t_p$. The aforementioned cycle of operation is repeated with the next succeeding primary neutron burst which occurs after the thermal neutron population has decayed to a background level as shown in FIG. 2.

During each of the first time windows $\Delta t_1$ the output from the radiation detector 27 is applied by gating circuitry to a first measurement channel in the uphole circuitry 21. During each of the second time windows $\Delta t_2$ the output from the detector is applied by the gating circuitry to a second measurement channel. In a further aspect of the invention, the output from the radiation detector also is applied during a third time interval to a third measuring channel. Preferably the third measuring channel is ungated such that the detector output is applied continuously throughout the entire cycle of operation. In this third channel the output from the radiation detector is manipulated, as disclosed in U.S. Pat. No. 3,510,655 to Givens, to derive a background correction factor which is then applied to the first and second measurement channels. In addition, a function representative of the detector output applied to the third measuring channel is recorded in order to provide an indication of porosity.

As can be seen from an examination of FIG. 2, the windows $\Delta t_1$ and $\Delta t_2$ are, for the gross measurement period $\Delta t_p$, wider than would be possible than if sequential time windows were employed. This enables a greater radiation count to be obtained over the gross measurement period $\Delta t_p$, thus resulting in substantially better statistical accuracy in measurement. In addition, since the induced thermal neutron population is dependent upon the intensity of fast neutrons in the primary neutron burst the invention enables the employment of a lower intensity source than would be possible with sequential nonoverlapping time windows. This is particularly advantageous when the invention is employed in conjunction with mechanically pulsed sources of the type disclosed in the aforementioned patent to Caldwell et al. The output intensity of such sources decays slowly with time independently of the frequency of use. By employing the present invention the useful life of such sources may be extended by 20 to 25 percent over the useful life possible with a detection scheme employing nonoverlapping sequential time windows. In addition, such mechanically pulsed sources have a relatively constant neutron output over successive cycles of operation. This is especially advantageous in the embodiment of the invention in which a porosity log is obtained.

As explained in the aforementioned patent to Mills, the thermal neutron population resulting from fast neutron irradiation decays exponentially as indicated by the generalized relationship of equation (1) above. Thus equation (1) may be applied to thermal neutron decay to arrive at the following specific relationship:

$$C_1/C_2 = e^{-\lambda\, t_1}(1-e^{-\lambda\, \Delta t_1})/e^{-\lambda\, t_2}(1-e^{-\lambda\, \Delta t_2}) \quad (2)$$

wherein:

$t_1$, $t_2$, $\Delta t_1$, and $\Delta t_2$ are as defined above with with respect to FIG. 2, $C_1$ and $C_2$ are the radiation counts, or count rates, observed during time windows $\Delta t_1$ and $\Delta t_2$, respectively, $e$ is the Napierian base, and $\lambda$ is the decay constant.

The decay constant may be expressed in terms of the following parameters:

$$\lambda = 1/\tau = V\Sigma \quad (3)$$

wherein:

$\tau$ is the mean life,

V is the velocity of thermal neutrons, and $\Sigma$ is the macroscopic capture cross section.

By substitution of terms from equation (3) to equation (2), and assuming that $\Delta t_1$ and $\Delta t_2$ are equal, the decay parameter $\Sigma$ can be determined by the following relationship:

$$\Sigma = \ln C_1 - \ln C_2/V(t_2 - t_1) \quad (4)$$

This relationship is valid even though the time windows $\Delta t_1$ and $\Delta t_2$ partially overlap and is theoretically independent of the period between times $t_1$ and $t_2$. However, as a practical matter it is preferred to provide an interval between $t_1$ and $t_2$ of at least 100 microseconds since significantly shorter intervals adversely affect the measurement resolution and require a more stringent measurement of the interval $t_2 - t_1$. Also the measurement time windows should be of substantially the same duration since the accuracy of measurements progressively decreases with the degree of inequality in this regard. While some departure from the ideal case can be expected because of lack of repeatability in instrumentation, this normally should be less than a few microseconds.

The time windows $\Delta t_1$ and $\Delta t_2$ may be of any suitable duration depending upon such factors as the mean lifetimes of the thermal neutrons (or other radiation events measured), natural radiation backgrounds, and the intensity of the primary radiation source. For a fast neutron source of an output intensity on the order of $10^8$ neutrons per second, time window durations of 200 to 400 microseconds are satisfactory for detection of thermal neutrons in normal logging environments. The degree of overlap will depend upon the time window durations and the available gross measurement period. Typically the time windows will overlap by about 25 to 75 percent of their durations. However, meaningful results may be obtained with an overlap of only 10 percent.

Figure 4:
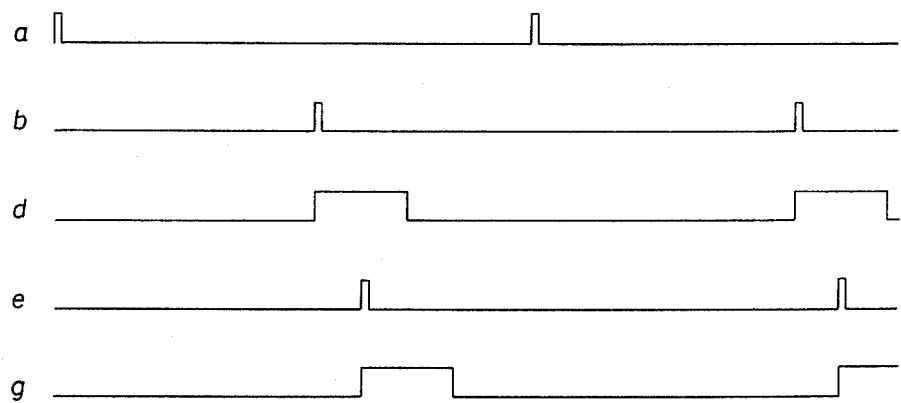
FIG. 4 illustrates certain waveforms associated with the operation of the circuitry shown in FIG. 3.

Turning now to FIG. 3 there is shown one form of control and analysis circuitry suitable for use in the invention. Certain waveforms associated with the operation of the circuitry in FIG. 3 are illustrated in FIG. 4. The waveforms and the points at which they appear in FIG. 3 are designated by common reference characters.

In operation of the system of FIG. 3, at the beginning of each fast neutron burst from source 26 (FIG. 1) a sync pulse $a$ is transmitted over conductor 35a to the uphole circuitry. In addition, the detector output signals from amplifier 36 (ideally one pulse each time a neutron strikes the detector 27) are transmitted over conductor 36a to the surface where they are applied to an amplifier 40 and then to a pulse shaper and discriminator 42. The pulse shaper discriminates against a signal output below a given low amplitude in order to reject signals associated with "noise." In response to a detector output above the discrimination level, the pulse shaper produces a constant amplitude, constant duration pulse. Thus if a helium-3 counter is employed as the downhole detector, each time a neutron strikes the counters and is absorbed by a helium-3 nucleus, a pulse appears in the output from pulse shaper 42. The output from pulse shaper 42 is applied to three measurement channels 44, 45, and 46, corresponding respectively to the first and second time windows $\Delta t_1$ and $\Delta t_2$ (FIG. 2), and to the entire cycle of operation.

Primary to each of measurement channels 44 and 45 are gating circuits 48 and 49, respectively, through which the output from the pulse shaper 42 is applied to count rate meters 50 and 52, respectively. Gates 48 and 49 are actuated by a control unit 54 which is synchronized by means of sync generator 35 with the downhole source 26. In operation of unit 54, a sync pulse $a$ is applied to a first time delay circuit 56. This circuit is a monostable multivibrator which responds to the sync pulse to produce a time delay pulse $b$ at time $t_1$ (FIG. 2) after the sync pulse. The output from circuit 36 is applied to a second monostable multivibrator 58 which functions to determine the width of the time window $\Delta t_1$. Each time a pulse $b$ is applied to circuit 58, it produces a pulse $d$ which remains positive for the period of $\Delta t_1$. This pulse actuates gating circuit 48. This gating circuit remains open during the time the output $d$ from circuit 58 is positive, thus allowing during this time the output from pulse shaper 42 to be applied to count rate meter 50. Meter 50 produces a D.C. voltage proportional to the pulse rate from pulse shaper 42 during the gate open period $\Delta t_1$.

The count rate meter 50 may be of any suitable type and typically will take the form of an R.C. averaging circuit with a relatively long time constant on the order of two to five seconds. Thus the voltage output from this meter is representative of the pulse rate from pulse shaper 42 over a great many cycles of operation.

The pulse output $b$ from circuit 56 also is applied to a second time delay circuit 60. This circuit responds to pulse input $b$ to produce a pulse $e$ at a time $t_2 - t_1$ after the occurrence of the pulse $b$ (and thus at time $t_2$ after sync pulse $a$). This pulse $e$ is applied to a multivibrator 62 which responds thereto by producing a positive-going pulse $g$ of a duration corresponding to $\Delta t_2$. This pulse is employed to actuate gating circuit 49. Gating circuit 49 remains open for the duration of pulse $g$, during which time the signal output from the pulse shaper 42 is applied to count rate meter 52 which operates similarly to meter 50.

The output from the pulse shaper 42 is applied continuously (ungated) throughout operation of the system to the third measuring channel 46 which comprises a count rate meter 64. Count rate meter 64 produces a D.C. voltage signal with an amplitude proportional to the pulse rate output of pulse shaper 42.

The output from meter 64 is employed to provide a background correction factor for measurements taken during windows $\Delta t_1$ and $\Delta t_2$ and also to provide an indication of the porosity of the formation under investigation. This latter function is accomplished by applying the output from meter 64 to one section 22a of recording means 22 where it is recorded in correlation with depth. While the output from meter 64 is influenced to some extent by thermal neutron decay, it is responsive to a greater degree to the slowing down of neutrons by hydrogen nuclei. Thus the log produced by recording means 22a is indicative of the porosities of formations for which decay parameters are also obtained. Moreover, since channels 44, 45, and 46 are responsive to a common detector output, the measurements for the decay log, including background detection, and the porosity log are based upon radiation detected at the same location relative to the source.

In providing for background correction the output from count rate meter 64 is applied to a multiplier circuit 65 where it is multiplied by a factor $K_1$. $K_1$ is an empirically determined value as described in the aforementioned patent to Givens and which typically may be on the order of 0.01. Thus the output from circuit 65 is a D.C. voltage signal having an amplitude about one one-hundredth of the voltage output from meter 64. The factor $K_1$ may be arrived at by operating the neutron source 26 in the wellbore in the OFF position (where the shutter 32 is interposed between the alpha emitters and targets) and determining the count rate from pulse shaper 42. The source is then operated in the pulsed mode (with the shutter rotating as in normal operation) and the count rate is again determined. $K_1$ is arrived at by dividing the shutter OFF count rate by the count rate obtained when the shutter is rotating normally.

The output from multiplier 65 is applied to a second multiplying circuit 66. Circuit 66 functions to produce a D.C. voltage output which is equal to the amplitude of the input voltage times the duration of each of the detection windows divided by the cycle period $t_c$.

The output from multiplier 66 is applied to subtracting circuits 68 and 70 in channels 44 and 45, respectively. The output from each of circuits 68 and 70 is thus equal to the voltage applied from its respective count rate meters less the voltage signal from multiplier 66. The manipulation of the output from the count rate meter 64 and its subtraction from the outputs of count rate meters 50 and 52 to serve correct these outputs for a neutron background resulting from fast neutrons emitted from the source during the time the source is OFF between bursts.

The corrected outputs from subtracting circuits 68 and 70 are then applied to logarithmic units 72 and 74. Each of units 72 and 74 produces a D.C. voltage signal of an amplitude with is proportional to the natural logarithm of the amplitude of the applied voltage signal. The outputs from units 72 and 74 are applied to a subtract circuit 76 where the amplitude of the voltage signal from the second channel 45 is subtracted from the voltage signal from the first channel 44. The output from subtract circuit 76 is applied to multiplier circuit 78 where it is multiplied by a factor $K_2$. $K_2$ is equal to the reciprocal of the product of the velocity of thermal neutrons V and the time $(t_2 - t_1)$ between the start of time windows $\Delta t_1$ and $\Delta t_2$. Thus from an examination of equation (4) above, it will be recognized that the output from multiplier 78 is representative of the macroscopic cross section $\Sigma$. The output from circuit 78 is applied to section 22b of recorder 22 where it is recorded as a function of depth of the tool 10 in the borehole in order to provide a decay log.

While the present invention is particularly well adapted for use with mechanically pulsed neutron sources, it is to be recognized that the invention may be practiced in conjunction with other suitable pulsed neutron sources. For example, accelerator-type deuterium-tritium sources such as those disclosed in U.S. Pat. No. 3,461,291 to Goodman or in the aforementioned patents to Youmans may be employed in carrying out the invention. It should also be recognized that the preferred times discussed above are applicable to thermal neutron decay measurements and may require modification when the invention is applied in other pulsed neutron logging applications. For example, if it is desired to measure epithermal neutron decay, the gross period available for measurements will be much shorter than as in the case of thermal neutron decay measurements. In this case, the measurement windows may exhibit durations on the order of 20 microseconds with the second window beginning perhaps 10 microseconds after the start of the first time window. The first time window will start during or immediately upon termination of the fast neutron burst.

I claim:

1. In the logging of a well traversing a subterranean formation, the method comprising:
   a. irradiating the formation with a burst of fast neutrons whereby said fast neutrons enter said formation and are moderated therein to form a lower energy neutron population, and
   b. during each of first and second time intervals occurring subsequent to the initiation of said fast neutron burst selectively measuring radiation attendant to said lower energy neutron population, said second time interval beginning during said first time interval and subsequent to the start of said first time interval and terminating subsequent to termination of said first time interval whereby each of said first and second time intervals partially overlap the other.

2. The method of claim 1 wherein the durations of said first and second time intervals are substantially equal.

3. The method of claim 1 wherein the radiation detected comprises neutrons from said lower energy neutron population.

4. The method of claim 1 wherein said first and second intervals begin subsequent to the termination of said fast neutron burst.

5. In the logging of a well traversing a subterranean formation, the method comprising:
 a. irradiating the formation with a burst of fast neutrons whereby said fast neutrons enter said formation and are moderated therein to form a population of thermal neutrons,
 b. selectively measuring radiation attendant to said thermal neutron population during a first time interval which occurs subsequent to said fast neutron burst,
 c. selectively measuring radiation attendant to said thermal neutron population during a second time interval which begins during said first time interval and subsequent to the start of said first time interval and extends beyond the termination of said first time interval whereby each of said first and second time interval partially overlap the other, and
 d. correlating a function representative of the measurements obtained during said first and second time intervals with depth.

6. The method of claim 5 wherein the durations of said first and second time windows are substantially equal.

7. The method of claim 5 wherein said second time interval begins at least one hundred microseconds after the beginning of said first time interval and extends beyond the termination of said first time interval by a period of at least one hundred microseconds.

8. The method of claim 5 further comprising:
 selectively measuring radiation attendant to said thermal neutron population during a third time interval,
 deriving a background correction factor from the measurement obtained during said third time interval,
 applying said factor to the measurements obtained during said first and second time intervals to provide a background correction in said measurements, and
 separately correlating a function representative of the measurement obtained during said third time interval with depth to provide an indication of the porosity of said formation.

9. The method of claim 5 wherein said radiation of said formation is accomplished by locating an emitter material characterized by the emission of alpha particles adjacent said formation and a target material characterized by the emission of fast neutrons in response to irradiation with alpha particles, and intermittently exposing said target material to alpha particles from said emitter material to produce bursts of fast neutrons.

10. In a well logging system, the combination comprising:
 a. a logging tool adapted for insertion into a borehole,
 b. a primary radiation source in said tool for emitting repetitive time-spaced bursts of primary radiation,
 c. a detection unit in said tool for detecting secondary radiation resulting from said primary radiation and producing output signals in response to said detected radiation,
 d. first and second measuring channels for producing first and second count rate functions representative of signals received from said detection unit,
 e. first and second gate means for applying during actuation thereof the output signals from said detection unit to said first and second measuring channels respectively,
 f. control means synchronized with said source for actuating said first gate means for repetitive first time intervals to apply the output from said detection unit to said first channel, and
 g. control means synchronized with said source for actuating said second gate means for repetitive second time intervals which begin during said first time intervals and subsequent to the start of said first time intervals and terminate subsequent to termination of said first time intervals whereby each of said first and second time intervals partially overlaps the other.

11. The system of claim 10 wherein said radiation source emits bursts of fast neutrons.

12. The system of claim 11 wherein said detection unit is responsive to radiation attendant to thermal neutrons.

13. The system of claim 12 further comprising:
 a third measuring channel responsive to the output from said detection unit for producing a third count rate function representative of signals received from said detection unit,
 means for deriving a background correction factor from said third count rate function,
 means for applying said factor to said first and second count rate functions to provide a background in said functions, and
 means for separately correlating said third count rate function with depth to provide a porosity log.

14. The system of claim 13 wherein said radiation source comprises emitter material characterized by the emission of alpha particles, target material characterized by the emission of fast neutrons in response to irradiation with alpha particles, and means for intermittently exposing said target material to alpha particles from said emitter material to produce bursts of fast neutrons.

15. The system of claim 14 wherein the output from said detection unit is applied continuously to said third measuring channel.

16. The system of claim 10 wherein said first and second gate means are actuated for substantially equal time intervals.

17. The method of claim 1 wherein said radiation of said formation is accomplished by locating an emitter material characterized by the emission of alpha particles adjacent said formation and a target material characterized by the emission of fast neutrons in response to irradiation with alpha particles, and intermittently exposing said target material to alpha particles from said emitter material to produce bursts of fast neutrons.

18. The system of claim 10 wherein said radiation source comprises emitter material characterized by the emission of alpha particles, target material characterized by the emission of fast neutrons in response to irradiation with alpha particles, and means for intermittently exposing said target material to alpha particles from said emitter material to produce bursts of fast neutrons.

* * * * *